April 14, 1925. 1,533,242
C. LE G. FORTESCUE
METHOD AND APPARATUS FOR PREVENTING ARMATURE COIL HEATING
Filed Aug. 8, 1919
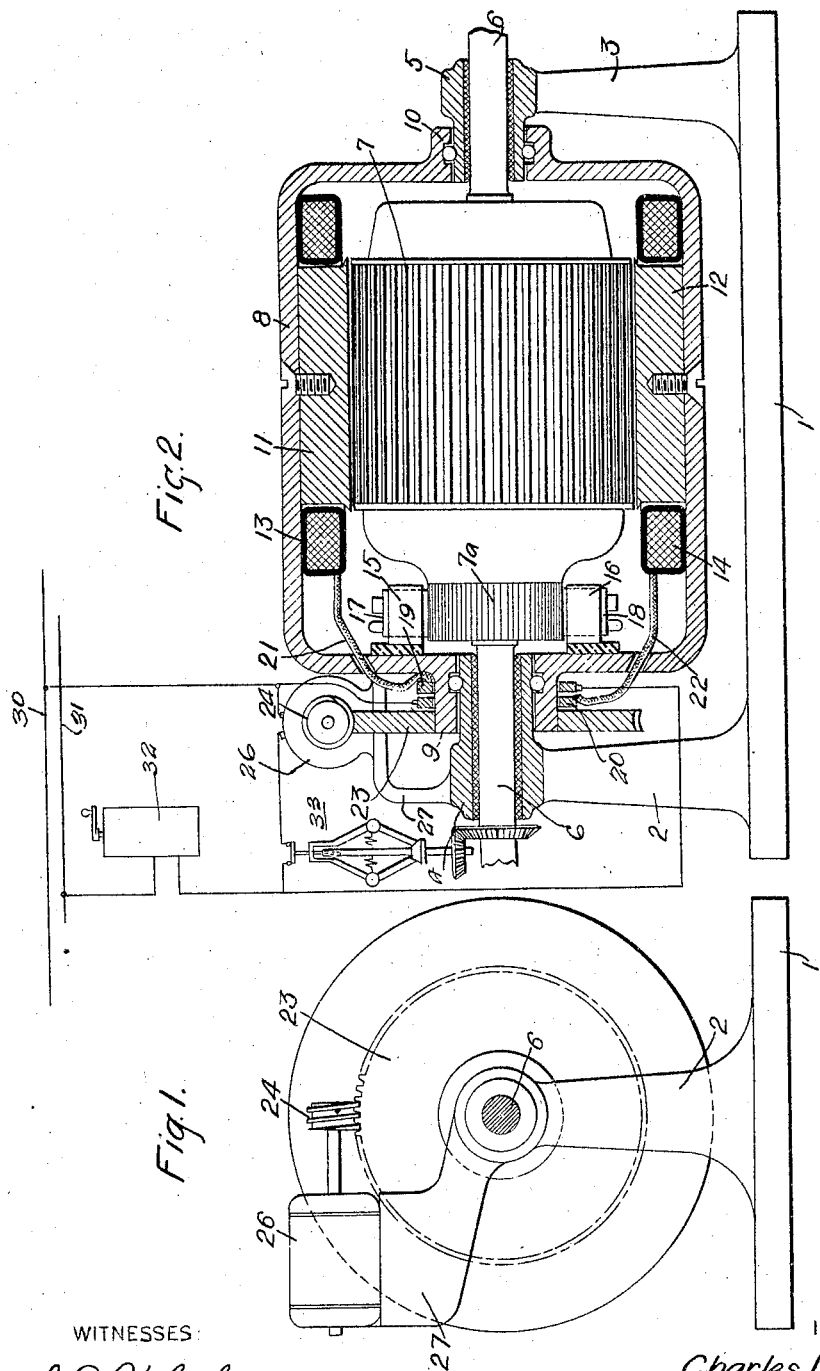
WITNESSES:
J. A. Helsel
A. A. Brand
INVENTOR
Charles LeG. Fortescue.
BY
ATTORNEY Patented Apr. 14, 1925.

1,533,242

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

METHOD AND APPARATUS FOR PREVENTING ARMATURE-COIL HEATING.

Application filed August 8, 1919. Serial No. 316,089.

*To all whom it may concern:*

Be it known that I, CHARLES LE G. FORTESCUE, a citizen of the United States, and a resident of Pittsburgh, in the county of Allegheny and State of Pennsylvania, have invented a new and useful Improvement in Methods and Apparatus for Preventing Armature-Coil Heating, of which the following is a specification.

My invention relates to commutator dynamo-electric machines, and it has for its object to provide a method and apparatus, in connection with machines of the character designated, which shall prevent the continual short circuiting of any one armature coil during the time that the armature winding is at standstill but energized with full-load voltage.

In order to more fully understand my invention, reference may be had to the accompanying drawing in which Figure 1 is an end elevational view of a machine aggregate embodying my invention, and Fig. 2 is a side view, partially in section and partially in elevation, of the machine shown in Fig. 1.

When machines of the character described are used for certain purposes, especially when employed as propulsion motors for electric railway vehicles, it is necessary that they be able to furnish full torque or withstand full-load voltage for a predetermined period, although, during that period, the armature or rotating element of the machine is maintained stationary. In the past, this requirement has frequently led to severe overheating of that armature coil which happens to be short circuited by the brushes during the standstill period, and it is the object of my invention, therefore, to provide means, in connection with a commutator machine which must undergo the above test, to prevent this continual short-circuiting of any one armature coil.

I propose to make the field frame of the commutator machine in such manner that it may be rotated very slowly during the time that the normally rotatable armature winding is stationary. Inasmuch as the brush rigging is attached rigidly to the field frame in such manner that the brushes are always in the correct position with respect to the field of the machine, they are also moved simultaneously with the field frame in such manner that successive coils are short circuited in the armature winding. By so arranging a dynamo-electric machine of the character described, I find that the excessive overheating which may be occasioned in fulfilling the above requirement during standstill is eliminated, and the heating is, moreover, more equally distributed in the various coils of the armature winding.

Referring more particularly to the drawing, a base 1, upon which are mounted supporting members 2 and 3, is shown. Journal members 4 and 5 are cast integrally with the supports 2 and 3, respectively, and are adapted to receive a shaft 6 upon which a normally rotatable armature winding 7 and associated commutator cylinder $7^a$ are mounted. A motor casing 8 is provided, at each end, with portions 9 and 10 which are exteriorly journaled about extended portions of the members 4 and 5, thus adapting the casing for independent rotary movement about the armature widing 7. Field-magnet pole pieces 11 and 12 are rigidly attached to the casing 8 and have field windings 13 and 14 respectively applied thereto. Brush holders 15 and 16 are likewise rigidly attached to the casing 8 and, therefore, move simultaneously therewith, and carry brushes 17 and 18, respectively, around the commutator $7^a$.

Pinioned to the portion 9 of the casing 8 are slip rings 19 and 20 to which are attached leads 21 and 22 respectively connecting the slip rings to the field-pole windings 13 and 14, thus furnishing means whereby the latter may be energized, even though the entire field frame is being rotated. It will be noted that I have not shown the electrical connections to the brushes or any brushes bearing upon the slip rings 19 and 20 and the connections whereby the field windings are energized. It will be understood that any means of effecting the electrical connections between the various members may be used.

A gear wheel 23 is rigidly attached to the casing 8 and is meshed with a worm wheel 24 which is driven by an auxiliary motor 26. A bracket member 27 provides a support for the motor 26.

Having described a dynamo-electric machine constructed in accordance with my invention, the operation thereof is as follows:

Assuming that the shaft 6 is attached to non-moving load, and, moveover, assuming that full voltage is applied to the brushes, it is necessary that the relative positions of the brushes and the armature coils shall be continually changed in order to prevent that coil which happens to be short circuited when the full voltage is applied to the armature winding from being burned out. Any suitable switching means may be provided to insure the automatic starting of the motor 26 at the time the voltage is applied to the armature winding 7 or the switching operations may be performed by hand. The field frame will then be slowly rotated through the medium of the worm wheel 25 and associated gear wheel 23, it being remembered that the latter is rigidly attached to the casing 8. Inasmuch as the brushes 15 move simultaneously with the field frame, no one armature coil will remain short circuited for any length of time, and, moreover, it is further to be noted that the brushes will always be in the correct position with respect to the field flux. Suitable electrical connections between the field windings and the slip rings 19 and 20 will insure the proper energization of the field windings 13 and 14, even though the casing 8 is being moved rotarily.

Any means may be employed whereby, upon the armature winding 7 attaining a predetermined speed, the motor 26 may be stopped. In particular, a centrifugally operated switch may be employed to perform this operation, or the switch may be opened by an attendant. When the motor 26 stops, the large difference in pitch between the worm wheel 25 and the gear wheel 23 meshing therewith, will provide a locking action, and the casing 8 will be maintained stationary during the time that the armature winding 7 is rotating in a normal manner.

As a concrete example of a switching mechanism for accomplishing the results hereinbefore mentioned, I have shown a supply-line comprising conductors 30 and 31 for energizing the main motor through brushes bearing upon the slip rings 19 and 20. A controller 32 is shown for starting and stopping the main motor. Connected across the brushes of the slip rings 19 and 20 is a circuit containing the small auxiliary motor 26 and a centrifugal switch 33 which is geared to the shaft 6 of the main motor, as shown. In this manner, whenever the controller 32 is operated to start the main motor, the auxiliary motor 26 is also started, but when the speed of the main motor reaches a predetermined value, the centrifugal switch 33 operates to open the circuit of the auxiliary motor, as hereinbefore described.

While I have described but one embodiment of my invention, it is apparent that many modifications therein may occur to those skilled in the art, and I desire, therefore, that it be limited only by the scope of the prior art or as specifically set forth in the appended claims.

I claim as my invention:

1. In a dynamo-electric machine, a normally rotatable torque-producing member, a normally stationary member, and means actuated in accordance with the starting conditions of said machine for moving the normally stationary member.

2. The combination of a commutator-type dynamo-electric machine having a normally stationary member and a rotatable torque-producing member, torque-transmitting means associated with said torque-producing member, and means for slowly moving said normally stationary member when the torque produced in said torque-producing member is insufficient to rotate said member against its load.

3. The method of preventing unequal armature heating of an electric motor producing torque at standstill which consists in causing the normally stationary member to rotate when the torque produced in the rotating member is insufficient to rotate said member against its load.

4. The method of operating a commutator-type electric motor which consists in energizing said motor to produce a torque at standstill and in causing different coils to be successively short-circuited while the torque-producing member is stationary.

5. The method of operating a dynamo-electric machine having a normally rotatable armature winding and a normally stationary field-pole frame, which consists in moving the field frame while the armature winding is stationary, and in locking the field frame in a stationary position when said armature winding moves at a predetermined speed.

6. In a commutator dynamo-electric machine, a normally rotatable armature winding provided with a commutator member and brushes bearing thereupon, a normally stationary field-pole frame provided with a gear wheel rigidly secured thereto, and driving means for said wheel whereby the field frame may be slowly rotated, said driving means constituting a lock for the field frame under predetermined conditions.

7. In a commutator dynamo-electric machine, a normally rotatable armature winding provided with a commutator member and brushes bearing thereupon, a normally stationary field-pole frame provided with a gear wheel rigidly secured thereto, an auxiliary motor for rotating said field frame, and means whereby the latter is locked into position when the auxiliary motor stops.

8. In a commutator dynamo-electric machine, a normally rotatable armature winding provided with a commutator member and brushes bearing thereupon, a normally stationary field-pole frame provided with a gear wheel rigidly secured thereto, and an auxiliary motor for said field frame and carrying a worm meshing with said gear wheel, whereby the field frame is locked in position when the auxiliary motor stops.

9. In a commutator dynamo-electric machine, a normally rotatable armature winding provided with a commutator member and brushes bearing thereupon, a normally stationary field-pole frame provided with a gear wheel rigidly secured thereto, and an auxiliary motor for said field frame and carrying a worm meshing with said gear wheel, whereby the field frame is locked in position when the auxiliary motor stops, and means whereby the field windings may be properly energized during their rotary movement.

10. In a commutator dynamo-electric motor, means for preventing the continual short circuiting of any one coil in said motor when the torque is insufficient to overcome the stand-still resistance of the load, and means whereby said first means may be rendered ineffective after the motor has attained a predetermined speed.

11. The method of operating an alternating-current commutator motor which consists in energizing said motor to produce a torque against a mechanical load, and in causing different coils to be successively short-circuited while said load is stationary.

In testimony whereof, I have hereunto subscribed my name this 30th day of July, 1919.

CHARLES LE G. FORTESCUE.